June 16, 1964

D. S. DENTRY ETAL 3,137,373

ADJUSTABLE BEARING BLOCK

Filed Jan. 12, 1961

INVENTORS
DEAN S. DENTRY
ROBERT C. HENDRICKS

BY

AGENT

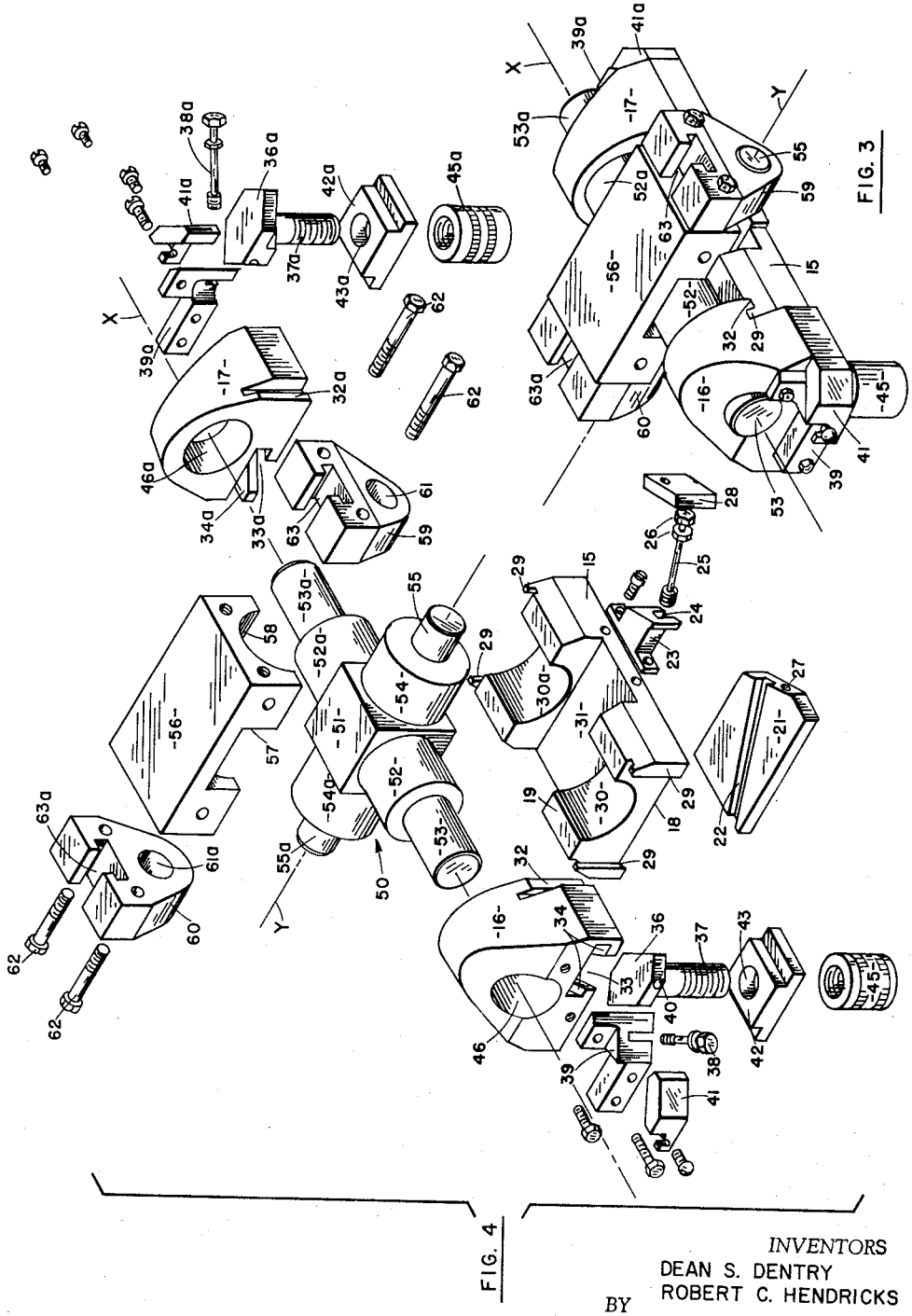

June 16, 1964     D. S. DENTRY ETAL     3,137,373
ADJUSTABLE BEARING BLOCK
Filed Jan. 12, 1961     3 Sheets-Sheet 3

INVENTORS
DEAN S. DENTRY
BY ROBERT C. HENDRICKS

*Lowell H. Turner*

AGENT

United States Patent Office 3,137,373
Patented June 16, 1964

3,137,373
ADJUSTABLE BEARING BLOCK
Dean S. Dentry, Whittier, Calif., and Robert C. Hendricks, Cleveland, Ohio, assignors to North American Aviation, Inc.
Filed Jan. 12, 1961, Ser. No. 82,268
13 Claims. (Cl. 189—36)

This invention pertains to means for connecting two relatively movable structures and more particularly to an adjustable mounting means for interconnecting structures such that changes from original relative positions thereof may be accomplished independently of the structure proper.

The adjustable mounting means of this invention is adaptable for interconnecting a variety of structures and is not to be taken as limited to a particular application. However, it has found its primary application as a means for adjustably interconnecting a rocket engine and the missile propelled thereby and is described herein as being so applied. More specifically, the adjustable mount is described in combination with a cross bearing gimbal.

Prior to the present invention, it was the practice in the field of rocketry to provide means for gimballing the rocket engine with respect to the missile and to provide independent means for moving the engine with respect to the missile in order to achieve accuracy of thrust alignment. The latter structure was bulky and heavy.

In the field of rocketry space and weight considerations are critical. The present invention provides means whereby with a minimum of structure, weight and mechanical complication, the rocket engine may be effectively gimballed and adjusted to bring the actual rocket engine thrust vector center line into proper orientation wtih respect to the missile.

It is a primary object of this invention to provide means for adjustably interconnecting a pair of relatively movable structures.

Another object is to provide a structural interconnection capable of adjustment to move one structure connected thereto with respect to another structure connected thereto.

A further object is to provide a means for cooperatively mounting a pair of structures in combination with means for accomplishing their relative movement through a full 360° about a reference point.

Yet another object is to provide means whereby a first structure may be moved along either or both of two transverse axes with respect to a second interconnected structure with minimum work input and a positive locking action upon completion of movement.

Yet another object is to provide the combination of a gimbal and a thrust vector central line adjustment means for mounting a rocket engine to a missile.

Other objects of invention will become apparent from the following description taken in connection with the accompanying drawings in which:

FIG. 3 is a perspective view of the FIG. 2 combination;

FIG. 4 is an exploded perspective view of the FIG. 3 structure;

Broadly, the present adjustable mounting means comprises a block having a key means mounted on one of its sides and adapted for restraining movement of attaching structure in one direction while allowing movement in a transverse direction, a second key means for restraining attaching structure movement in the transverse direction while allowing movement in the first-mentioned direction, means for actuating such movements, and means upon the block for accomplishing its intermediate connection between a pair of structures to be relatively positioned thereby. The mount may include a cross-bearing gimbal in the combination.

Figure 1:
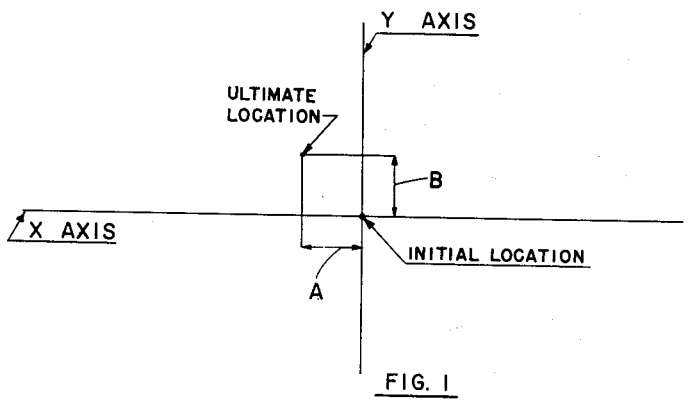
FIG. 1 is a diagram illustrating initial and ultimate positions of a reference point as effected by the adjustments of this invention in its movement along a pair of mutually perpendicular axes.

In FIG. 1 of the accompanying drawings, a diagram illustrating a typical movement procedure of the adjustable mount shows an X axis and a Y axis lying in a common plane. These axes are representative of the hereinafter described X and Y axes of the mount assembly. The origin of the axes is considered as a specific reference point upon the adjustable mount and is indicated in FIG. 1 as being the initial location. When it is desired that a first structural unit attached to one side of the mount be moved to a new location with respect to a second structural unit attached to the opposite mount side, one key means upon the mount is actuated so as to move the first structure along one of the axes, for example, the distance indicated by arrow A along the X axis. Subsequently, by actuating the second key means, the structure is moved along the Y axis, for example, the distance indicated by the arrow B. This brings the reference point of the structure to the position indicated as the ultimate location. Adjustment is thus possible through a full 360° about the origin.

The structure whereby such movement is accomplished is specifically illustrated in FIGS. 2 through 6 of the drawings.

In each of FIGS. 2 through 6 the adjustable mounting means is illustrated in combination with a cross-bearing gimbal for adjustably swivel mounting a rocket engine to a missile structure.

Figure 2:
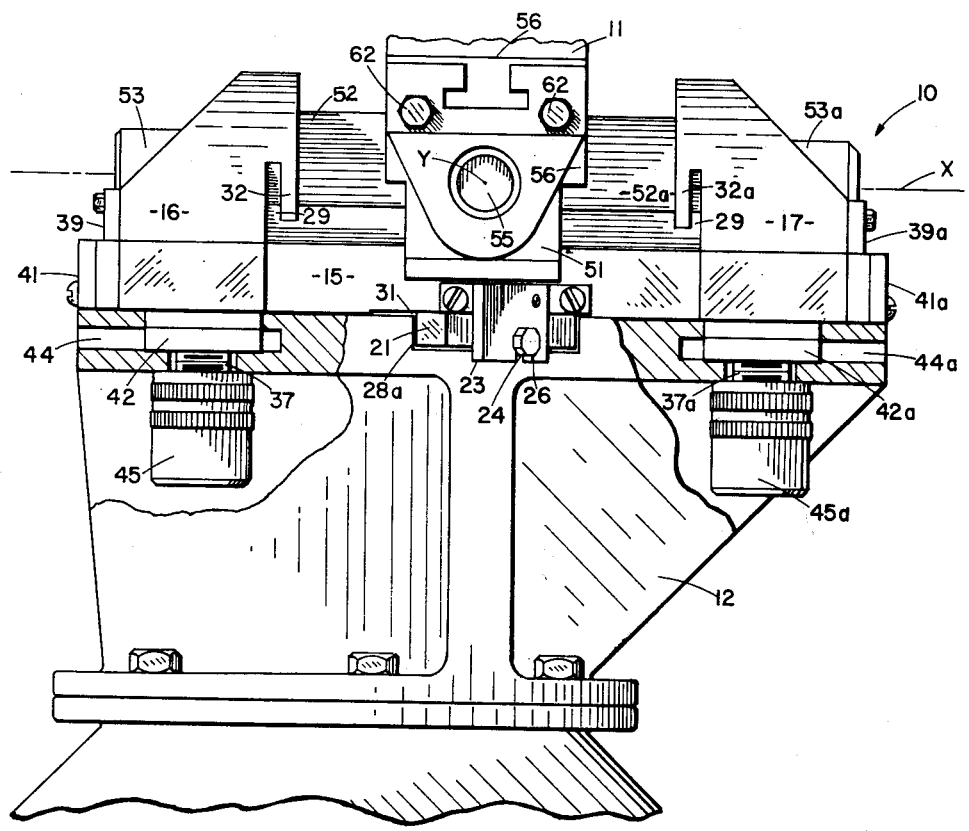
FIG. 2 is an elevation of the adjustable mount and bearing combination of this invention shown connecting a partially cutaway rocket engine support structure to a missile structure.

A typical installation for facilitating both engine gimballing and adjustable movement along either of two axes is illustrated in FIG. 2 wherein the overall assembly is indicated by numeral 10. Missile structure 11 to which the assembly is attached is connected at the upper extremity of assembly 10 and rocket engine attachment structure 12 is connected to the lower assembly extremity.

Figure 5:
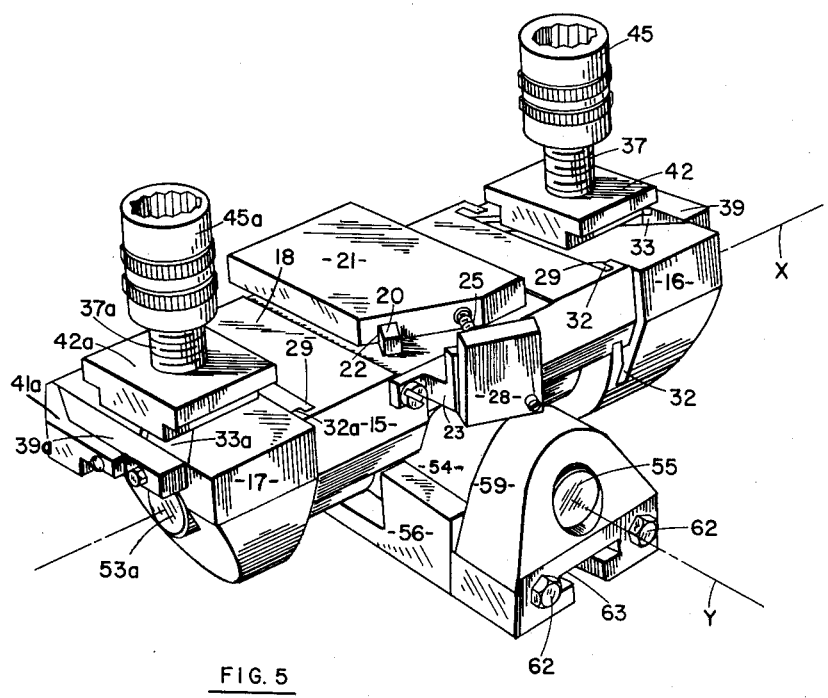
FIG. 5 is a cutaway perspective of the assembly of FIGS. 2 and 3 shown in inverted position.

Assembly 10 in its preferred embodiment is more specifically illustrated in FIGS. 3 through 5. In FIG. 3, the assembly is oriented as normally installed; in FIG. 4 as exploded to illustrate all of the component parts and their interrelations; and in FIG. 5 it is inverted by rotation about the Y axis to better indicate the various key and actuating means in assembly.

The adjustable mounting portion of this invention (best illustrated in FIGS. 4 and 5) comprises a block made up from a central portion 15 and a pair of end portions 16 and 17, each portion including means for accomplishing adjustments of attached structure. Central portion 15 includes a first surface 18 and a second surface 19. A diagonal key 20 (FIG. 5) extends from surface 18 and a movable key 21 including a slot or keyway 22 therein is slidably positioned upon surface 18 such that diagonal key 20 slidably engages keyway 22.

A bracket 23 which is attached to block portion 15, includes a slot 24. A screw 25 has a double head 26 rotatably retained within slot 24. The outer portion of head 26 is conventionally shaped to accept a tool for causing its rotation. The opposite extremity of screw 25 is threaded for engagement with internally threaded hole 27 contained within movable key 21 parallel to keyway 22. Rotation of screw 25 causes movable key 21 to slide over block surface 18 under the directional control of the diagonal key and way, extension or retraction being dependent upon the screw rotational direction. A cover 28 may be provided to protect screw head 26 from being turned inadvertently after its final position has been established. When installed in its operable position, movable key 21 is nested within a slot or way, e.g., slot 28a in the rocket engine structure of FIG. 2, so as to be movable therethrough responsive to force applied through screw 25.

Center block 15 includes upon its ends keyed flanges 29 adapted to engage mating flanges upon end pieces 16 and 17. Arcuate bearing pads 30 and 30a for receiving a pair of gimbal bearing arms are defined in surface 19 and are separated by a slot 31.

End pieces 16 and 17 are sometimes referred to as retainers or lower retainers since these are the parts which retain the attached structure. They are usually manufactured as mirror images of one another. The structure of retainer 16 only is described, the comparable components of retainer 17 being indicated on the drawings by the subscript "a" affixed to the identifying numeral.

Retainer 16 includes a pair of flanges 32 on its inner side engageable with flanges 29 of block portion 15. It also includes a keyway 33 extending diagonally approximately from its outer extremity to its inner extremity. Keyway 33 includes flanges 34 for slidably retaining a key. Key 36, which may form the head of a bolt shank 37, is positioned in keyway 33 to slide diagonally therethrough responsive to force applied through double headed screw 38. Screw 38 is rotatably retained by bracket 39 and is threadedly engaged with internally threaded hole 40 in key 36 in a manner similar to that explained above with respect to key 25. Screw rotation results in the ultimate positioning of key 36 within its keyway. A cover member 41 may be attached to end piece 39 over bolt 38 for protection against unwarranted rotation.

A separate key 42 contains a perforation 43 through which bolt shank 37 is inserted. Key 42 is flanged for slidable engagement with attaching structure, e.g., as engaged within slots 44 of the FIG. 2 engine attachment structure. Obviously, movement of key 36 and shank 37 necessitates the simultaneous movement of key 42.

Nut 45 is threadedly retained upon shank 37 for securing the ultimate positional relation of the structures. It may be of a conventional nature or constructed as a socket (see FIG. 5) having internal serrations for tightening by means of an Allen wrench.

Retainer 16 is provided with a cylindrical receptacle 46 adapted to receive a cross-bearing gimbal arm for relative rotation therein.

A cross-bearing generally indicated as 50 (FIG. 4) contains a center portion 51 from which a pair of oppositely positioned bearing arms having portions 52 and 52a of major diameter and portions 53 and 53a of minor diameter extend. A second pair of oppositely positioned arms extend in directions normal to the above-mentioned arms and have major diameter portions 54 and 54a and minor diameter portions 55 and 55a. Bearing center portion 51 is adapted to be received in a clearance fit within slot 31 of center block portion 15, bearing arm portions 52 and 52a nesting for rotation within bearing pads 30 and 30a, respectively, and bearing arm portions 53 and 53a being rotatably nested within receptacle 46 and 46a, respectively.

An upper gimbal bearing block 56 includes a slot 57 therein in a direction transverse to that of slot 31 in center block 15. It is also provided with a pair of arcuate bearing pads 58 transverse in direction to pads 30 and 30a of center block 15. Block 56 is retained over bearing center portion 51 and bearing arm portions 54 and 54a, the latter arm portions nesting in bearing relation within pads 58. Upper bearing block end pieces 59 and 60 includes receptacles 61 and 61a for the acceptance of bearing arm members 55 and 55a, respectively. End pieces 59 and 60 are conventionally secured to upper bearing block 56. Bolts 62 are herein supplied for this purpose, the connection being made such that the upper block and its end pieces function as an integral unit. End pieces 59 and 60 are illustrated as including keyways 63 and 63a for the attachment of supporting structure. However, comparable attaching means may obviously be substituted.

When the assembly is operationally installed, as in FIG. 2, upper gimbal bearing block 56 and end pieces 59 and 60 are retained in a stationary position with respect to supporting structure 11. Cross-bearing 50 is free to rotate about its Y axis a limited amount within the upper bearing block, and about its X axis a limited amount within the lower bearing block. The rotational travel in each case is limited by the clearance between bearing center portion 51 and bearing block slots 31 and 57. Hence, rocket engine structure 12, which is attached to the lower bearing block, may be gimballed about either the X or Y axis without movement of supporting structure 11. Gimbal actuating forces are supplied by conventional means (not shown) attached to the rocket engine and missile structures.

As described in reference to FIG. 1, the procedure followed in adjusting the position of structure 12 relative to structure 11 is to move structure 12 first along one axis, then along the opposite axis until the ultimately desired position is attained. Movement along the Y axis is accomplished by simultaneously turning screws 38 and 38a into their respective threaded holes within keys 36 and 36a, causing those keys to be moved along their respective keyways 33 and 33a. When keys 36 and 36a are retracted toward the outer keyway extremities, keys 42 and 42a, retained upon bolt shanks 37, move outward within slots 44 and 44a of structure 12 along the X axis. However, keys 42 and 42a are retained against transverse movement along the Y axis. Since keys 36 and 36a move with components of direction along both the X and Y axes and since the motion along the X axis is absorbed by outward movement of keys 42 and 42a in opposite directions, the resultant movement of supported structure 12 is, in FIG. 3, to the lower right along the Y axis, the keys transmitting the movement force to the structure 12 is, in FIG. 3, to the lower right along the to the upper left is accomplished by turning the screws in the opposite direction so as to reject keys 36 and 36a and move keys 42 and 42a inward. Hence, screws 38 and 38a are rotated clockwise or counterclockwise until such time as the supported structure is positioned in its desired location upon the Y axis.

Movement of structure 12 along the X axis is accomplished by rotating screw 25 in a direction to force movable key 21 along diagonal key 20 and through slot 28a in supported structure 12 (FIG. 2). Key member 21 is moved with components of direction along each of the X and Y axes. Being retained by slot 28a against relative movement along the X axis, key 21 moves with respect to structure 12 only along the Y axis. As key 21 so moves, diagonal key 20 and way 22 cooperatively force key 21 against the sides of keyway 28a within supported structure 12, causing that structure to be moved along the X axis, keys 42 and 42a allowing such movement while preventing movement along the Y axis. Dependent upon the direction of movement along the X axis required, clockwise or counterclockwise rotation of screw 25 is continued until such time as the ultimate position upon the X axis is attained.

When the adjustable mounting mechanism portion of this invention is utilized independent of the described gimbal bearing, center bearing block 15 and end block portions 16 and 17 are usually integrated as a single unit, the keys, keyways and adjusting screws remaining in the described relationships.

Through utilization of the described diagonal keys and keyways of the preferred embodiment the work input required for accomplishing adjustments under heavy load conditions is considerably reduced over that which would be required were the keys and keyways oriented parallel to the X and Y axes. Additionally, the described adjustment means also provides a positive and effective locking action. The angular nature of the component parts locks their relative positions so as to prevent further movement once the adjustment is completed. Structural misalignment after the ultimate position is once established is thereby positively prevented.

Figure 6:
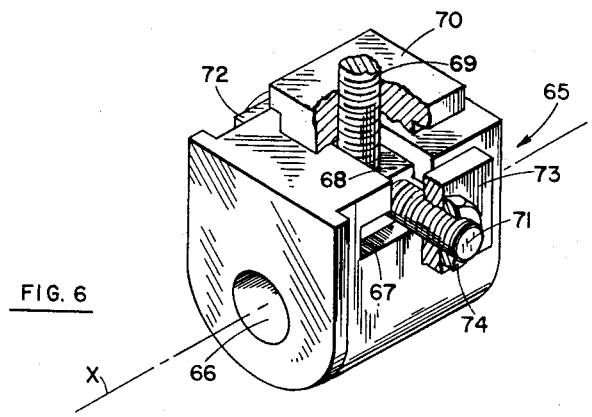
FIG. 6 is a cutaway perspective of a second embodiment of an end portion of the mount.

While the diagonal key and keyway arrangement is preferred, adjustment means in parallel orientation with respect to the Y axis may be utilized. The illustration of an alternate bearing block end portion incorporating such an adjustment configuration is illustrated in FIG. 6. Therein end piece 65 includes a receptacle 66 for the acceptance of a bearing. A keyway 67 defined in the end piece extends therethrough in a direction normal to the X axis. Slidably retained within keyway 67 is a key 68 which includes an extenison stud 69. This stud extends through and interconnects a separate key 70 for movement with stud 69 and key 68. Key 68 is threadedly perforated and a bolt 71 is threaded therethrough. The bolt also extends through a pair of retainer plates 72 and 73 and is retained by a nut 74. When bolt 71 is turned through key 68 that key is moved through keyway 67. Since key 70 is connected to key 68 for movement therewith and, when operably installed, is positioned within structure which prevents its movement parallel to the Y axis, except as moved with that structure, the ultimate result is that the end block remains stationary while keys 68 and 70 move, causing the supported structure to move in like manner. The ultimate positioning of the keys and attached structure may be positively secured by a lock washer, lock wire or other conventional means applied to screw 71 so as to prevent further rotation.

Where desirable a pair of end pieces 65 may replace end pieces 16 and 17 of the configuration of FIGS. 2 through 5. End pieces 65, being identical in most applications, are reversible. This is of assistance in the reduction of manufacturing costs.

Although the invention has been described and illustrated in detail, it is to be clearly understood that this is by way of illustration and example only, and is not to be taken by way of limitation, the spirit and scope of this invention being limited only by the terms of the amended claims.

We claim:

1. Adjustable mounting means comprising a block; a first adjustable means including a diagonal key extending from a surface of said block, and a movable key having a keyway therein slidably engaging said diagonal key and adapted for engagement with structure attached to said block; second adjustable means including means in said block defining two keyways, a slidable key mounted in each said keyway, and a separate key attached to each said slidable key and adapted for sliding engagement with structure attached to said block; and separate force-transmitting means attached to said movable key and to each of said slidable keys for moving said keys relative to said blocks.

2. The adjustable mounting means of claim 1, wherein each of said last-mentioned means is a rotatably-mounted screw retained against axial movement, each said screw being threaded into its respective key for moving said key along its keyway when said screw is rotated.

3. An adjustable mount for connecting two relatively movable structures comprising a block having first and second sides; a slide keyed approximately centrally of said first side for movement thereover, said slide adapted to prevent block movement along a first axis; means attached to said block and said slide for causing ultimate block movement along a second axis; means defining a pair of keyways in said first side adjacent opposite ends of said block; a pair of keys slidably positioned within said keyways; separate key means attached to and movable with said keys for preventing block movement along said second axis; and means attached to said block and to each said key for moving said block along said first axis.

4. An adjustable mount for connecting two relatively movable structures comprising an elongated block, a diagonal key extending from a first side of said block approximately centrally thereof, means in said first side defining a pair of diagonal keyways, a first one of said keyways being adjacent a first end of said block and a second one of said keyways being adjacent a second end of said block, a movable key slidably retained upon said first side and including means defining a diagonal slot therein, said slot means positioned in sliding relationship over said diagonal key, said movable key adapted for slidable movement with a keyway means upon a mating structure, a separate diagonal movable key slidably retained in each said diagonal keyway, an attachment key retained thereupon for movement with each said diagonal movable key and adapted for sliding movement with keyway means in said mating structure in a direction normal to said first-mentioned movable key, and means upon said first side and upon an opposite second side for the attachment of relatively movable mating structures, whereby said first-mentioned movable key prevents movement of said block along the major axis of said block while facilitating movement normal thereto and said attachment keys facilitate movement of said block along the major axis while preventing movement in a direction normal thereto.

5. An adjustable mounting means comprising a block, said block including a central portion and two end portions, a key extending from a first side of said central portion diagonally thereof, a movable key having a slot therein slidably engaging said diagonal key for controlling relative block-to-attaching structure movement along a single block axis and for restraining relative movement along an axis normal thereto, said end portions engaging said central portion at opposite ends thereof, means in each said end portion defining a keyway therein, a key slidably-retained in each said keyway, a separate key attached to each said slidably-retained key for controlling relative block-to-attached structure movement along said normal axis and for restraining relative movement along said single axis, cross-bearing receiving and retaining means defined in a second side of said central portion and in said end portions, a cross-bearing retained in said receiving means, means attaching said block to a first structure, and means connected to said bearing attaching said bearing to a second structure.

6. The adjustable mounting means of claim 5, wherein said keyways in said end portions converge diagonally toward one another from opposite end piece extremities.

7. The adjustable mounting means of claim 5, where said keyways in said end portions extend normal to a major axis of said blocks.

8. The adjustable mounting means of claim 5, wherein said bearing receiving means includes means defining a groove in a side of said central portion opposite said keys, a pair of axially aligned arcuate bearing receptacles in said block, one said receptacle on each side of said groove, means in each said end portion defining a cylindrical bearing receptacle of smaller radius than and in axial alignment with said arcuate bearing receptacles; wherein said bearing includes a central portion disposed within said groove, two pairs of cylindrical bearing members having coplanar axes and extending in a cross pattern from said last-mentioned block in mutually perpendicular directions, each said bearing member having a major diameter portion and a minor diameter portion, said major diameter portion of a first pair of said bearing members being retained in said arcuate receptacles and said minimum diameter portions being retained in said cylindrical bearing receptacles, and wherein said attachment means to the second structure includes bearing receiving means similar to first-mentioned bearing receiving means, said attachment means being positioned normal to said block and retained in bearing relation with a second pair of said bearing members in the manner described with relation to said first pair.

9. Adjustable mounting means comprising a block, said block having a first key means for restricting movement of said block relative to attaching structure to a single axial direction, said first key means including a movable key in slidable engagement with said block, a second key means for restricting block movement relative to attaching structure in a single axial direction normal to said first-mentioned direction, said first key means being diagonally disposed to said single axial direction, and attachment means upon said block for connection to the independent structures.

10. Adjustable mounting means comprising a block, first key means upon said block including a first key fixedly extending from a surface of said block, a key adapted to move in a single axial direction having means defining a keyway therein slidably engageable with said first key, said first key and said keyway being oriented diagonally with respect to said axial direction, said movable key being engageable with attached structure for providing restriction of relative movement of said block and such attached structure to a single axial direction, a second key means for restricting block movement relative to attaching structure to a single axial direction normal to said first-mentioned direction, and attachment means upon said block for connection of independent structures.

11. Adjustable mounting means comprising a block, said block having a first key means for restricting movement of said block relative to attaching structure to a single axial direction, a second key means for restricting block movement relative to attaching structure to a single axial direction normal to said first-mentioned direction, said second key means including means in said block defining two keyways, a slidable key retained in each keyway, a separate key attached to each said slidable key and adapted for a sliding engagement with interconnected structure, and attachment means upon said block for connection to independent structure.

12. Adjustable mounting means comprising a block, said block having a first key means for restricting movement of said block relative to attaching structure to a single axial direction, a second key means for restricting block movement relative to attaching structure to a single axial direction normal to said first-mentioned direction, said second key means including means in said block defining two keyways, said keyways converging diagonally from opposite block extremities, a slidable key retained in each said keyway, a separate key attached to each said slidable key and adapted for a sliding engagement with interconnected structure, and attachment means upon said block for connection to independent structures.

13. Adjustable mounting means comprising a block, said block having a first key means for restricting movement of said block relative to attaching structure to a single axial direction, a second key means for restricting block movement relative to attaching structure to a single axial direction normal to said first-mentioned direction, said second key means including means in said block defining two keyways, said keyways being normal to a major axis of said block, a slidable key retained in each said keyway, a separate key attached to each said slidable key and adapted for sliding engagement with interconnected structure, and attachment means upon said block for connection to independent structure.

References Cited in the file of this patent
UNITED STATES PATENTS
614,247     Goodhew et al. _____ Nov. 15, 1898